(12) United States Patent
Schollenberger et al.

(10) Patent No.: US 8,461,250 B2
(45) Date of Patent: Jun. 11, 2013

(54) POWDERY COMPOSITION, IN PARTICULAR FOR COATING METAL SUBSTRATES

(75) Inventors: Claudio Schollenberger, Gossau (CH); Andreas Singer, Wald (CH)

(73) Assignee: Schekolin AG (LI)

( * ) Notice: Subject to any disclaimer, the term of this patent is extended or adjusted under 35 U.S.C. 154(b) by 107 days.

(21) Appl. No.: 13/138,480

(22) PCT Filed: Dec. 11, 2009

(86) PCT No.: PCT/CH2009/000391
§ 371 (c)(1),
(2), (4) Date: Sep. 27, 2011

(87) PCT Pub. No.: WO2010/096938
PCT Pub. Date: Sep. 2, 2010

(65) Prior Publication Data
US 2012/0022206 A1 Jan. 26, 2012

(30) Foreign Application Priority Data
Feb. 26, 2009 (CH) ........................ 288/09

(51) Int. Cl.
*C08L 67/02* (2006.01)
(52) U.S. Cl.
USPC ........................... 524/539; 524/601; 524/904
(58) Field of Classification Search
USPC ........................ 524/539, 601, 904
See application file for complete search history.

(56) References Cited

U.S. PATENT DOCUMENTS

| 5,491,202 A | 2/1996 | Umehara et al. |
| 6,184,311 B1 | 2/2001 | O'Keeffe et al. |
| 2007/0141373 A1 * | 6/2007 | Sommerfeld et al. ........ 428/480 |

FOREIGN PATENT DOCUMENTS

| EP | 0 408 465 A1 | 1/1991 |
| EP | 0 957 141 | 2/2004 |
| EP | 1 550 915 A1 | 7/2005 |
| EP | 1 561 785 | 8/2005 |
| WO | WO 97/44394 A1 | 11/1997 |
| WO | WO 98/39493 | 9/1998 |
| WO | WO 00/55268 | 9/2000 |
| WO | WO 2006/125545 A1 | 11/2006 |

OTHER PUBLICATIONS

Brochure for GRILTEX by EMS-Griltech, Switzerland, 16 pages, May 2008.*

* cited by examiner

*Primary Examiner* — Tae H Yoon
(74) *Attorney, Agent, or Firm* — George Pappas

(57) ABSTRACT

A powdery composition, in particular for coating metal substrates, comprises approximately 70% to approximately 80% of a polyester mixture, relative to the total weight of the composition. Relative to the weight of the polyester mixture, the polyester mixture comprises approximately 57% to approximately 58% of a first copolyester, approximately 35% to approximately 36% of a second copolyester, and approximately 7% of a third copolyester.

2 Claims, No Drawings

POWDERY COMPOSITION, IN PARTICULAR FOR COATING METAL SUBSTRATES

This application is a 371 national phase of PCT/CH2009/000391 having an international filing date of Dec. 11, 2009, which claims benefit of Switzerland patent application 288/09 filed Feb. 26, 2009, the disclosure of which are incorporated herein by reference.

TECHNICAL FIELD

The invention relates to a powder composition, particularly for coating a metal substrate.

PRIOR ART

A composition of the above mentioned kind is known, for example, from WO 00/55268. The powder composition described therein, which is intended for coating a metal substrate such as the wall of a metal can or of another metal container, is notably designed to apply a well adhering, chemically and mechanically resistant coating onto the substrate.

The composition described in WO 00/55268 comprises the following components:
a) about 50% to about 100%, by total weight of the composition, of a blend of polyesters comprising:
  i) a first copolyester having a weight average molecular weight of about 10'000 to about 80'000 and a glass transition temperature of at least 45° C. to about 100° C.; and
  ii) a second copolyester having a weight average molecular weight of about 10'000 to about 70'000 and a glass transition temperature of about −10° C. to about 45° C.;
  wherein the glass transition temperature of the first polyester is about 5° C. to about 60° C. higher than that of the second polyester;
b) 0% to about 25%, by total weight of the composition, of a modifying resin;
c) 0% to about 50%, by total weight of the composition, of an inorganic filler material;
d) 0% to about 4%, by total weight of the composition, of a flow control agent; and
e) 0% to about 50%, by total weight of the composition, of a second modifying polymer.

A substantial aspect of the powder composition according to WO 00/55268 appears to be that the blend of polyesters present as the major component comprises two copolyesters with different glass transition temperatures. The glass transition temperature (Tg) of a polymer is the temperature at which a transition from a brittle glassy state to a plastic state occurs. In the powder composition according to WO 00/55268, one of the copolyesters has a relatively high glass transition temperature of at least 45° C. to about 100° C. whereas the other copolyester has a relatively low glass transition temperature of about −10° C. to about 45° C., wherein the said glass transition temperatures differ by at least about 5° C. to 60° C., preferably by about 15° C. to 35° C. and, particularly, about 20° C. to about 30° C. According to WO 00/55268, the coatings that are produced by using such powder compositions are sufficiently flexible so that they can be mechanically deformed without developing cracks. Concomitantly, the said coatings are also sufficiently rigid to ensure an excellent scratch resistance and abrasion resistance.

DESCRIPTION OF THE INVENTION

An object of the invention is to provide further powdery compositions for coating a metal substrate that are particularly suitable as so-called seam protection powders but are also suitable as holohedral powder coatings for protective and esthetic purposes.

The powder composition of the present invention comprises:
a) about 70% to about 80%, by total weight of the composition, of a blend of polyesters comprising:
  i) about 57% to about 58%, by total weight of the blend of polyesters, of a first copolyester having a melting interval of about 162° C. to about 172° C., a glass transition temperature of about 25 to 28° C., a melt viscosity (at 190° C./2.16 kg) of about 650 Pa·s and a melt volume index MVR (at 190° C./2.16 kg) of about 16 cm$^3$/10 min;
  ii) about 35% to about 36%, by total weight of the blend of polyesters, of a second copolyester having a melting interval of about 150° C. to about 160° C., a glass transition temperature of about 25 to 26° C., a melt viscosity (at 190° C./2.16 kg) of about 300 Pa·s and a melt volume index MVR (at 190° C./2.16 kg) of about 35 cm$^3$/10 min;
  iii) about 7%, by total weight of the blend of polyesters, of a third copolyester having a melting interval of about 157° C. to about 167° C., a glass transition temperature of about 18 to 23° C., a melt viscosity (at 190° C./2.16 kg) of about 850 Pa·s and a melt volume index MVR (at 190° C./2.16 kg) of about 12 cm$^3$/10 min;
b) 0% to about 19.2%, by total weight of the composition, of an inorganic filler material;
c) 0% to about 0.8%, by total weight of the composition, of a flow control additive; and
d) 0% to about 10%, by total weight of the composition, of a dye pigment.

Surprisingly, it was found that the composition of the present invention is suitable for coating a metal substrate by virtue of the selection of three copolyesters with well defined characteristics, even though, in contrast to WO 00/55268, it does not contain a copolyester having a glass transition temperature above 45° C.

The three copolyesters can be synthesized by esterification of an acid component and a diol component. Advantageously, in all of the three copolyesters the acid component is a blend formed mainly of terephthalic acid and isophthalic acid, whereas the diol component is either butanediol or a blend of butanediol and ethylene glycol. A particularly preferred selection of the three copolyesters is shown in Table 1.

TABLE 1

Preferred copolyester compositions

|  | First copolyester | Second copolyester | Third copolyester |
| --- | --- | --- | --- |
| Molar ratio iso-:terephthalic acid | 1.00:2.30 | 1.00:3.65 | 1.00:2.48 |
| Molar ratio butane diol:ethylene glycol | 0.00 | 1.00:4.80 | 0.00 |
| Number averaged molar mass $M_n$ [g/mol] | 26'900 | 22'500 | 26'200 |
| Weight averaged molar mass $M_w$ [g/mol] | 69'300 | 54'300 | 68'300 |
| Melting interval [° C.] | 162 to 172 | 150 to 160 | 157 to 167 |
| Glass transition temperature [° C.] | 25 to 28 | 25 to 26 | 18 to 23 |
| Melt viscosity at 190° C./2.16 kg [Pa · s] | 650 | 300 | 850 |
| Melt volume index MVR at 190° C./2.16 kg [cm$^3$/10 min] | 16 | 35 | 12 |
| Type of resin Griltex ® D | 2036 E | 1874 E | 1982 E |

In a preferred embodiment, the first copolyester consists of Griltex® D 2036 E, the second copolyester consists of Griltex® D 1874 E and the third copolyester consists of Griltex® D 1982 E. These commercially available copolyesters can be purchased at Ems-Chemie, Domat-Ems (Switzerland).

Modes for Carrying out the Invention

The compositions mentioned in the following examples 1 to 3 are processed to a compound. Subsequently, a powder with a particle size of less than about 100 μm, preferably of 15 to 70 μm, is produced by cold grinding and sieving. The powder is sprayed by means of an electrostatic spraying device onto thin metal sheets and then melted onto the same in a oven during 40 seconds at a temperature of 280° C. After cooling to room temperature, a coating with a layer thickness of less than about 100 μm, preferably of 15 to 70 μm, is obtained.

TABLE 2

Powder compositions

| Component | Product name | Content in % by weight | | |
|---|---|---|---|---|
| | | Example 1 | Example 2 | Example 3 |
| First copolyester | Griltex ® D 2036 E | 40.0 | 43.6 | 46.4 |
| Second copolyester | Griltex ® D 1874 E | 25.0 | 26.2 | 28.0 |
| Third copolyester | Griltex ® D 1982 E | 5.0 | 5.2 | 5.6 |
| Dye pigment | titanium dioxide | 10.0 | 7.0 | — |
| Dye pigment | iron oxide-alpha | — | 1.0 | — |
| Dye pigment | carbon black | — | 0.14 | — |
| Filler material | mica | 3.0 | 3.0 | 3.0 |
| Filler material | aluminum silicate | 3.2 | 3.2 | 3.2 |
| Filler material | barium sulfate | 13.0 | 9.86 | 13.0 |
| Coating additive | Lanco Flow P 10 | 0.8 | 0.8 | 0.8 |
| Total | | 100.0 | 100.0 | 100.0 |
| Color | | white | gray | transparent |

Titanium dioxide can be purchased, for example, in the form of the commercially available product Kronos 2430.

Iron oxide-alpha (FeOOH) can be purchased, for example, in the form of the commercially available product Bayferrox 3910.

Carbon Black, also termed as industrial soot, can be purchased, for example, in the form of the commercially available product Printex V.

Mica can be purchased, for example, in the form of the commercially available product Micro Mica W1.

Aluminum silicate can be purchased, for example, in the form of the commercially available product ASP 400 P.

Barium sulfate can be purchased, for example, in the form of the commercially available product Blanc Fixe N.

Lanco Flow P 10 is a commercially available coating additive based on an acrylate polymer.

It will be understood that, depending on the application, other dye pigments can be chosen instead of the dye pigments mentioned above, in which case another mixing ratio of the dye pigment:filler material may be chosen as needed.

Submersion Test

Sections of tin-coated steel sheets were coated with the composition according to example 1 or with one of three conventional compositions. The latter were selected as an epoxide containing polybutylene terephthalate powder ("PBT/Epoxy", examples 1 and 2) and a polybutylene terephthalate powder without epoxide ("PBT", example 3).

The coated sheet sections were sterilized at 124° C. during 70 minutes. Subsequently, they were submersed in one of 12 test media at 70° C. during 5 days or 10 days. Finally, the coating was tested by means of a cross incision and by means of a folding test, respectively. The results of these submersion tests are presented in Table 3.

TABLE 3

Submersion test of coated metal substrates: delamination (in mm) under cross incision/folding test

| | Comparative example 1 PBT/Epoxy | | Comparative example 2 PBT/Epoxy | | Comparative example 3 PBT | | Example 1 Invention | |
|---|---|---|---|---|---|---|---|---|
| | Submersion time at 70° C. | | | | | | | |
| Test media | 5 days | 10 days | 5 days | 10 days | 5 days | 10 days | 5 days | 10 days |
| D | 0/0 | 0/0 | 0/0 | 0/0 | 0/0 | 0/0 | 0/0 | 0/0 |
| S | X | X | X | X | X | X | X | X |
| R | 0/0 | 0/0 | 0/0 | 0/0 | 0/0 | 5/0 | 0/0 | 0/0 |
| O | 0/0 | 0/0 | 0/0 | 0/0 | 0/0 | 0/0 | 0/0 | 0/0 |
| Methyl alcohol | 5/2 | X | 10/0 | X | 2/0 | X | 2/0 | X |
| Ethyl alcohol | 0/0 | 0/0 | 5/0 | 5/0 | 1/0 | 0/0 | 0/0 | 0/0 |
| Isopropyl alcohol | 0/0 | 0/0 | 4/0 | 4/0 | 0/0 | 7/0 | 0/0 | 0/0 |
| Diethylene glycol monobutyl ether | 0/0 | 0/0 | 3/0 | 3/0 | 5/0 | 0/0 | 0/0 | 0/0 |
| Light heating oil EL | 1/0 | 0/0 | 3/0 | 3/2 | 3/0 | 3/0 | 0/0 | 0/0 |
| Toluene | 0/0 | 0/0 | 0/0 | 0/0 | 0/0 | 0/0 | 0/0 | 0/0 |
| Tomatoes | 0/0 | 0/0 | 0/0 | 0/0 | 0/0 | 3/0 | 0/0 | 0/0 |
| Tuna fish | 0/0 | 0/0 | 0/0 | 0/0 | 0/0 | 0/0 | 0/0 | 0/0 |

Legend:
X Inner coating (liquid enamel) destroyed
D, S, R, O Submersion media

Resistance Test

Coated sections of tin-coated steel sheets were produced analogously to those used in the submersion test (see above) and then immersed in one of 29 test media at room temperature during 21 days. The results of the subsequent testing of the coatings are presented in Table 4.

TABLE 4

Resistance test of coated metal substrates

| Test medium | Comparative example 1 PBT/Epoxy | Comparative example 2 PBT/Epoxy | Comparative example 3 PBT | Example 1 Invention |
|---|---|---|---|---|
| Methyl alcohol | +++/- | ++/-- | +++/- | ++++ |
| Ethyl alcohol | ++++ | ++/-- | ++++ | ++++ |
| Isopropyl alcohol | ++++ | +++/- | +++/- | ++++ |
| n-Butyl alcohol | ++++ | ++/-- | ++++ | ++++ |
| 4-Hydro-4-methyl-2-pentanone | ++/-- | ---- | +++/- | +++/- |
| N-Methyl-2-pyrrolidone | +/--- | ---- | +/--- | ++/-- |
| Propylene glycolmethyl ether acetate | ++/-- | +/--- | +++/- | +++/- |
| Ethylene glycolmonoisopropyl ether | +++/- | ++/-- | ++++ | ++++ |
| Diethylene glycol monobutyl ether | ++/-- | ---- | ++++ | ++++ |
| Acetone | +/--- | ---- | ++/-- | +++/- |
| Methyl ethyl ketone | +/--- | ---- | ++/-- | ++/-- |
| Isobutyl methyl ketone | ++/-- | +/--- | +++/- | +++/- |
| Cyclohexanone puriss. | +/--- | ---- | ++/-- | +++/- |
| Isophorone | ++/-- | ---- | +++/- | +++/- |
| Acetic acid ethyl ester | ++/-- | ---- | ++/-- | +++/- |
| Acetic acid-n-butyl ester | +++/- | ++/-- | +++/- | ++++ |
| Special gasoline 100/140 EA | ++++ | ++++ | ++++ | ++++ |
| Test gasoline 145/200 | ++++ | ++++ | ++++ | ++++ |
| Light heating oil EL | ++++ | ++++ | ++++ | ++++ |
| Nitroethane | ++/-- | ---- | ++/-- | +++/- |
| N,N-Dimethyl formamide | ++/-- | ---- | ++/-- | +++/- |
| Diethyl ether | +++/- | ++/-- | ++++ | ++++ |
| Toluene | +/--- | ---- | ++/-- | +++/- |
| Xylene | ++/-- | ++/-- | +++/- | +++/- |
| Decahydronaphthalene | ++++ | ++++ | ++++ | ++++ |
| Tetrahydrofuran puriss | +/--- | ---- | +/--- | ++/-- |
| Monopropylene glycol monomethyl ether | ++/-- | +/--- | +++/- | +++/- |
| Motor oil 15/W40 | ++++ | ++++ | ++++ | ++++ |
| Mains water | ++++ | ++++ | ++++ | ++++ |

Legend:
++++ resistance unchanged
+++/- slight softening, adhesion all right
++/-- softening, loss of gloss, loss of brilliance, slight loss of adhesion
+/--- strong softening, loss of brilliance, loss of adhesion
---- coating destroyed, blistering, complete loss of adhesion Concluding Remarks Suitable metal substrates are, in particular, tin-coated steel sheets, ECCS sheets (electrolytic chromium coated steel) and TFS sheets (tin free steel), respectively, but also aluminum parts. As is generally known, tin-coated steel sheets, but also ECCS and TFS sheets, are used for cover plates and for two-part cans; aluminum is also used for cover plates and for two-part cans, but also for mono block aerosol cans and for collapsible aluminum tubes.

The powder composition for coating a metal substrate according to the present invention, particularly has the following advantages in comparison with conventional solvent containing enamel systems:
VOC-free and therefore without emissions;
not a dangerous good for transportation;
storage without legal restrictions;
"100% system", i.e. 1 kg of powder results in 1 kg of coating.

Summary

A powder composition, particularly for coating a metal substrate, comprises about 70% to about 80%, by total weight of the composition, of a blend of polyesters. The blend of polyesters comprises—by total weight of the blend of polyesters—about 57% to about 58% of a first copolyester, about 35% to about 36% of a second copolyester and about 7% of a third copolyester.

The invention claimed is:

1. A powder composition, particularly for coating a metal substrate, comprising:
   a) about 70% to about 80%, by total weight of the composition, of a blend of polyesters comprising:
      i) about 57% to about 58%, by total weight of the blend of polyesters, of a first copolyester having a melting interval of about 162° C. to about 172° C., a glass transition temperature of about 25 to 28° C., a melting viscosity (at 190° C./2.16 kg) of about 650 Pa·s and a melting volume index MVR (at 190° C./2.16 kg) of about 16 cm$^3$/10 min;
      ii) about 35% to about 36%, by total weight of the blend of polyesters, of a second copolyester having a melting interval of about 150° C. to about 160° C., a glass transition temperature of about 25 to 26° C., a melting viscosity (at 190° C./2.16 kg) of about 300 Pa·s and a melting volume index MVR (at 190° C./2.16 kg) of about 35 cm$^3$/10 min;
      iii) about 7%, by total weight of the blend of polyesters, of a third copolyester having a melting interval of about 157° C. to about 167° C., a glass transition temperature of about 18 to 23° C., a melting viscosity (at 190° C./2.16 kg) of about 850 Pa·s and a melting volume index MVR (at 190° C./2.16 kg) of about 12 cm$^3$/10 min;
   b) 0% to about 19.2%, by total weight of the composition, of an inorganic filler material;
   c) 0% to about 0.8%, by total weight of the composition, of a flow control agent; and
   d) 0% to about 10%, by total weight of the composition, of a dye pigment.

2. A composition according to claim 1, wherein the first copolyester consists of GRILTEX D 2036 E, the second copolyester consists of GRILTEX D 1874 E and the third copolyester consists of GRILTEX D 1982 E.

* * * * *